(12) United States Patent
Lin

(10) Patent No.: US 6,570,108 B2
(45) Date of Patent: May 27, 2003

(54) MOUSE SWITCH MECHANISM FOR DETERMINING A ROTATIONAL DIRECTION OF A RATCHET ON A POINTING DEVICE

(75) Inventor: Hao-Fong Lin, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 09/683,728

(22) Filed: Feb. 7, 2002

(65) Prior Publication Data

US 2003/0038018 A1 Feb. 27, 2003

(30) Foreign Application Priority Data

Aug. 23, 2001 (TW) .......................... 90120706 A

(51) Int. Cl.[7] ............................ G09G 5/08; H01H 19/00
(52) U.S. Cl. ...................... 200/6 B; 200/11 R; 345/163
(58) Field of Search ................ 200/6 B, 11 R–11 TW, 200/568, 569, 553–567, 6 BA, 6 BB, 1 TK; 345/163–166

(56) References Cited

U.S. PATENT DOCUMENTS

| 3,299,225 | A | * | 1/1967 | Heath ........................ 200/6 B |
| 3,691,326 | A | * | 9/1972 | Grossman et al. ..... 200/11 TW |
| 4,816,623 | A | * | 3/1989 | Huang ...................... 200/11 R |
| 5,808,568 | A | * | 9/1998 | Wu ........................ 345/163 X |
| 5,912,661 | A | * | 6/1999 | Siddiqui ................. 345/163 X |
| 6,127,636 | A | * | 10/2000 | Parvulescu et al. ....... 200/11 R |
| 6,326,949 | B1 | * | 12/2001 | Merminod et al. ......... 345/163 |

* cited by examiner

Primary Examiner—J. R. Scott
(74) Attorney, Agent, or Firm—Winston Hsu

(57) ABSTRACT

A switch mechanism has a ratchet, two tappets, and two sensors. The ratchet has a plurality of sawteeth. The tappets are installed at two opposite sides of the ratchet. Each sensor is installed beside the ratchet for generating detecting signals. When the ratchet rotates clockwise, the sawteeth of the ratchet will push one tappet toward its corresponding sensor so as to generate corresponding clockwise detecting signals. When the ratchet rotates counterclockwise, the sawteeth of the ratchet will push the other tappet toward its corresponding sensor so as to generate corresponding counterclockwise detecting signals.

7 Claims, 11 Drawing Sheets

| Time period / Output signals of the two sensonr | t1 | t2 | t3 | t4 | t5 | t6 | ... |
|---|---|---|---|---|---|---|---|
| Output signals when rotate clockwise | 01 | 00 | 10 | 11 | 01 | 00 | ... |
| Output signals when rotate counterclockwise | 00 | 01 | 11 | 10 | 00 | 01 | ... |

Fig. 5 Prior art

MOUSE SWITCH MECHANISM FOR DETERMINING A ROTATIONAL DIRECTION OF A RATCHET ON A POINTING DEVICE

BACKGROUND OF INVENTION

1. Field of the Invention

The present invention relates to a switch mechanism, and more specifically to a switch mechanism that is used in a pointing device to decide a rotational direction of a wheel installed on the pointing device.

2. Description of the Prior Art

In computer systems, the use of a windowing operating system to browse, edit or otherwise manipulate data is commonplace. Distinct graphical areas termed windows are displayed on the monitor that is connected to the computer system. Documents are displayed within the confines of the window for perusal by a user. If a document is too large, then only a portion of the document is displayed inside the window. If the user desires to see off-window portions of the document, then a mouse is used to manipulate a scroll bar located on a side of the window to scroll the window, and hence bring the hidden portions of the document into view. For example, if the user desires to browse in a downward direction within the window, the user clicks on a downward arrow sign of the scroll bar (by way of the mouse), and the document will move upward by a predetermined unit, usually by a line of text. Similarly, if the user wants to browse in an upward direction, the user uses the mouse to click on an upward arrow sign of the scroll bar, and the document is scrolled downward. The above is a familiar ground to general computer users, and so nothing more need be said about it.

FIG. 1 is a perspective view of a mechanical mouse 10 with a wheel 14 according to a prior art. The mechanical mouse 10 comprises a housing 12. The wheel 14 is installed in the housing 14, and is capable of rotating clockwise and counterclockwise so as to control a scroll bar on a side of a window to move the scroll bar upward and downward, enabling the user to scroll the window and thus conveniently browse a document. When the user is perusing a portion of a document, the user may rotate the wheel 14 of the mouse 10 clockwise to activate the scroll bar to scroll the document upward. Alternatively, the user may rotate the wheel 14 counterclockwise to activate the scroll bar to scroll the document downward. This is a familiar convenience that is well-know in the art.

FIG. 2 is a perspective view of an inner portion of the mechanical mouse 10. FIG. 3 is a top view of the inner portion of the mechanical mouse 10. As shown in FIG. 2 and FIG. 3, the mechanical mouse 10 further comprises a substrate 16 installed inside the housing 12, an support 20 installed on the substrate 16 having a notch 21, a shaft 18 connected with the wheel 14 rotatably installed inside the notch 21 of the support 20, a first light source 42 and a second light source 44 installed adjacent to the wheel 14 on two ends of the support 20, and a first sensor 32 and a second sensor 34 installed on an opposite side of the wheel 14 at two ends of the upholder 20. The wheel 14 has a rough surface 22, and a plurality of narrow gaps 24 extend along a radial direction as measured from the center of the wheel 14. The first light source 42 and the second light source 44 generate light 46 and light 48, respectively. The first sensor 32 and the second sensor 34 are used to detect the light 46 and light 48 passing through the narrow gaps 24 respectively, and generate corresponding detecting signals.

FIG. 4a is a diagram of output signals of the two sensors 32 and 34 on a time axis when the wheel 14 of the prior art mechanical mouse 10 rotates clockwise. FIG. 4b is a diagram of output signals of the two sensors 32 and 34 on a time axis when the wheel 14 of the prior art mechanical mouse 10 rotates counterclockwise. FIG. 5 is a table contrasting output signals of the two sensors 32 and 34 with time when the wheel 14 of the mechanical mouse 10 rotates clockwise and counterclockwise as shown in FIG. 4*1* and FIG. 4*b*. When a user rotates the wheel 14, the shaft 18 rotates inside the notch 21 of the support 20. The narrow gaps 24 also rotate, following the wheel 14. The number of narrow gaps 24 is carefully considered in the design of the wheel 14, as are both the spacing between adjacent gaps 24 and the width of the gaps 24. In a corresponding way, the positions of the first sensor 32, the second sensor 34, the first light source 42 and the second light source 44 are carefully selected. These carefully selected parameters enable differentiation of clockwise and counter-clockwise rotation of the wheel by waveform phase analysis of two optically detected signals. When the wheel 14 rotates clockwise and permits the light 46 generated by the first light source 42 to just pass through a narrow gap 24 to the first sensor 32, the first sensor 32 will detect the light 46 and generate an output signal "1" (i.e., a high-potential signal). At the same time, the light 48 generated by the second light source 44 is blocked by the spacing between two narrow gaps 24, and so the second sensor 34 is unable to detect the light 48 and generates an output signal "0" (i.e., a low-potential signal). Then, as the wheel 14 continues to rotate clockwise, the light 46 generated by the first light source 42 passes through the middle portion of the narrow gap 24, continuing to arrive at the first sensor 32. At the same time, the light 48 generated by the second light source 44 just passes through a narrow gap 24 and arrives at the second sensor 34. Hence, the output signals generated by the first sensor 32 and the second sensor 34 are "1" and "1", respectively. Continuing in this manner, it should be clear that the design of the narrow gaps 24 generates a phase discrepancy of 90 degrees between the output signal of the first sensor 32 and the second sensor 34. As the wheel 14 continues to rotate clockwise, the output signals generated by the first sensor 32 and the second sensor 34 become "0" and "1", respectively. As the wheel 14 rotates clockwise even more, the output signals generated by the first sensor 32 and the second sensor 34 change to "0" and "0", respectively.

Although the wheel 14 is capable of vertical movement along the shaft 18 (i.e., that the wheel 14 is movable up-and-down while rotating inside the notch 21 of the support 20), such movement does not affect the result of the output signals of the corresponding first sensor 32 and the second sensor 34. That is, the phase difference between the output signals of the first sensor 32 and the second sensor 34 remains 90 degrees.

As shown in FIG. 4*a*, FIG. 4*b* and FIG. 5, when the wheel 14 rotates clockwise, if the output signal of the first sensor 32 is "0", then the output signal of the second sensor 34 will be "1" inside a period t1. The output signal of the sensors 32 and 34 inside period t1 may thus be though of as "01". If the wheel 14 continues to rotate clockwise, the output signal of the sensors 32 and 34 inside period t2 will be "00". The output signal of the sensors 32 and 34 inside period t3 is "10". The output signal of the sensors 32 and 34 inside period t4 is "11". The output signals of the sensors 32 and 34 inside periods t5 and t6 are same as the output signals of the sensors 32 and 34 inside periods t1 and t2, respectively. The output signals of the first sensor 32 and the second sensor 34 are thus periodic over four cycles. To determine whether the wheel 14 is rotating clockwise or counterclockwise, one need only determine if the arrangement of the output signals of the sensors 32 and 34 changes from "01", "00", "10" to "11" in the proper sequence. For example, when the output signal of the sensors 32 and 34 changes from "00" to "10", it is inferred that the wheel 14 is rotating clockwise. Similarly, when the wheel 14 rotates counterclockwise, the output signals of the first sensor 32 and the second sensor 34 also have four periods in a cycle. The output signal of the sensors 32 and 34 inside period t1 is "00". The output signal of the sensors 32 and 34 inside period t2 is "01". The output signal of the sensors 32 and 34 inside period t3 is "11". The output signal of the sensors 32 and 34 inside period t4 is "10". The output signals of the sensors 32 and 34 inside periods t5 and t6 are same as the output signals of the sensors 32 and 34 inside periods t1 and t2, respectively. Therefore, to decide whether the wheel 14 is rotating counterclockwise, one simply determines if the arrangement of the output signals of the sensors 32 and 34 changes from "00", "01", "11" to "10" in order. For example, when the output signal of the sensors 32 and 34 changes from "10" to "00", it is inferred that the wheel 14 is rotating counterclockwise.

FIG. 6 is a diagram of the output signals of the two sensors 32 and 34 versus time when the wheel 14 of the prior art mechanical mouse 10 rotates clockwise, wherein the width of one narrow gap 24 of the wheel 14 is too small. As shown in FIG. 6, the output signals of the sensors 32 and 34 inside periods t8, t9 and t10 are "11", "01" and "00", respectively. If the first sensor 32 receives light 46 that passes through a gap 24 having a gap width that is too small, the phase difference of the output signals of the wheel 14 detected by the sensors 32 and 34 will not be 90 degrees. The output signals of the sensors 32 and 34 inside periods t11 and t12 is "00" and "11" respectively. As the wheel 14 rotates continues its clockwise rotation, the output signal of the sensors 32 and 34 inside period t13 becomes "01".

Due to a flaw in a gap 24, when the wheel 14 rotates from period t10 to period t11, the output signal of the sensors 32 and 34 does not change, but remains "00". The computer system thus determines that from period t10 to period t11, the "the wheel 14 does not rotate". When the wheel 14 rotates from period t11 to period t12, the output signal of the sensors 32 and 34 changes from "00" to "11". From FIG. 5 it is clear that the output signal of the sensors 32 and 34 never changes from "00" to "11", regardless of whether the wheel 14 is rotating clockwise or counterclockwise. The computer system is thus unable to determine the rotational direction of the wheel 14, which may cause the mouse 10 to behave erratically. A similar problem occurs with a counterclockwise rotation of the wheel 14. As the rotational direction of the wheel 14 is determined by the order of the output signals of the two sensors 32 and 34, if the width of a narrow gap 24 of the wheel 14 is too large or too small, incorrect output signals may easily occur, leading to an incorrect determination of the rotational direction of the wheel 14.

SUMMARY OF INVENTION

It is therefore a primary objective of the present invention to provide a switch mechanism for use inside a pointing device that is capable of accurately determining the rotational direction of a wheel.

The present invention, briefly summarized, discloses a switch mechanism comprising a ratchet, two tappets, and two sensors. The ratchet has a plurality of sawteeth. The tappets are installed at two opposite sides of the ratchet. Each sensor is installed adjacent to the ratchet for generating detecting signals. When the ratchet rotates clockwise, the sawteeth of the ratchet will push one tappet toward its corresponding sensor so as to generate corresponding clockwise detecting signals. When the ratchet rotates counterclockwise, the sawteeth of the ratchet will push the other tappet toward its corresponding sensor so as to generate corresponding counterclockwise detecting signals.

It is an advantage that the switch mechanism of the present invention mouse is able to accurately determine the rotational direction of a wheel using a single detecting signal that is generated by either the first sensor or the second sensor. There is no need for two separate detecting signals.

These and other objectives and advantages of the present invention will no doubt become obvious to those of ordinary skill in the art after reading the following detailed description of the preferred embodiment that is illustrated in the various figures and drawings.

BRIEF DESCRIPTION OF DRAWINGS

FIG. 5 is a table contrasting output signals of two sensors with time when the wheel of the mechanical mouse rotates clockwise and counterclockwise.

DETAILED DESCRIPTION

Figure 1:
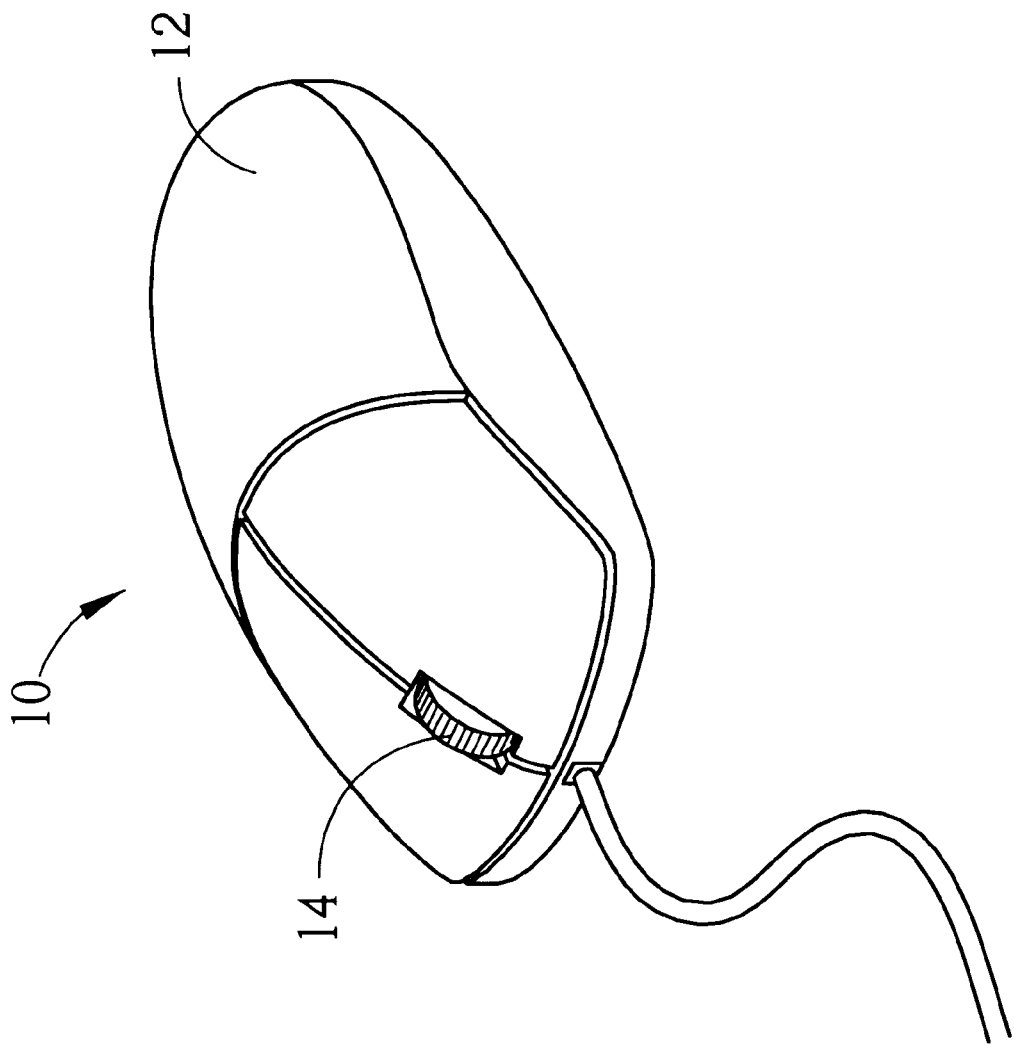
FIG. 1 is a perspective view of a mechanical mouse with a wheel according to the prior art.
Figure 2:
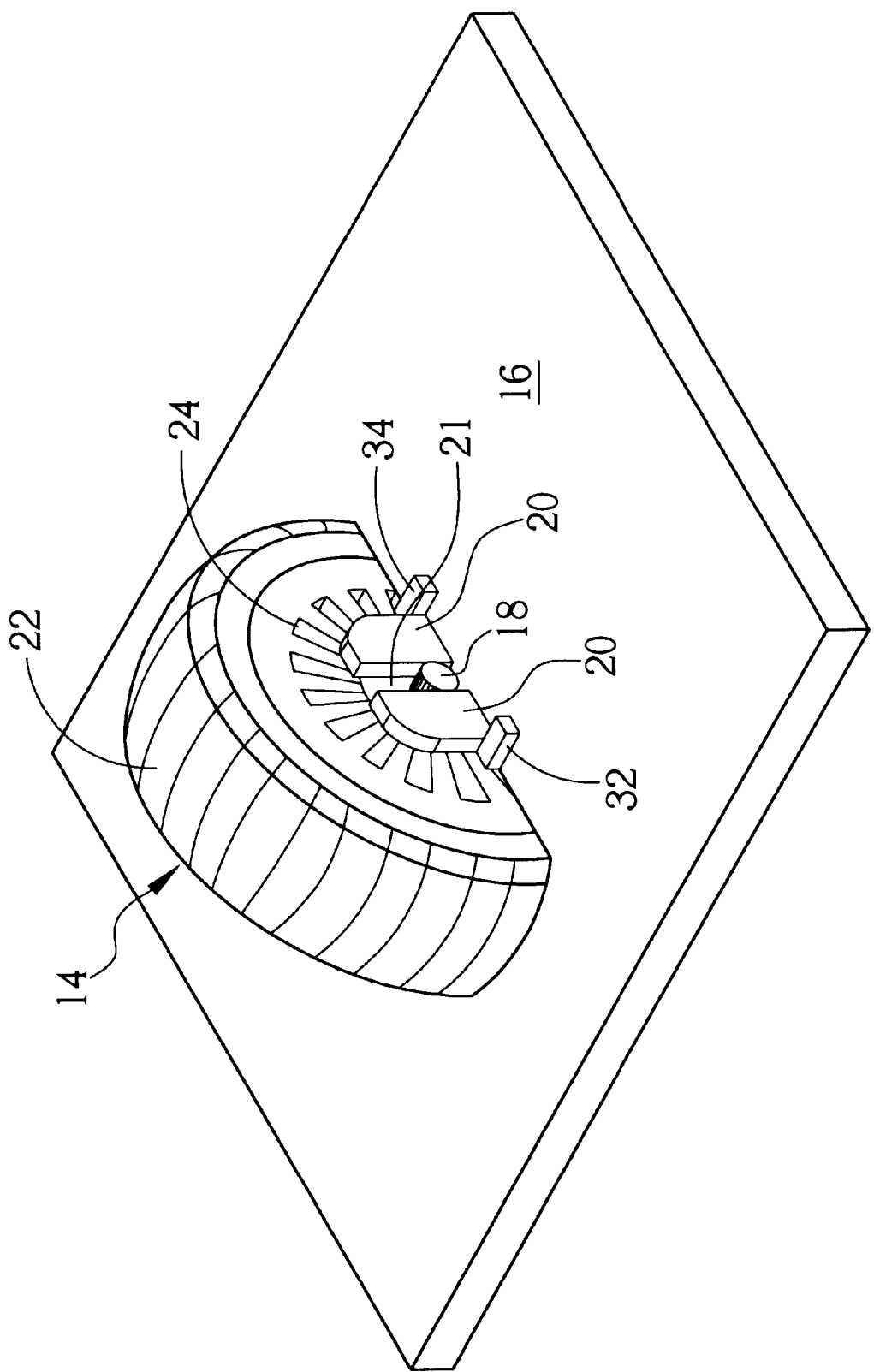
FIG. 2 is a perspective view of an inner portion of the mechanical mouse of FIG. 1.
Figure 3:
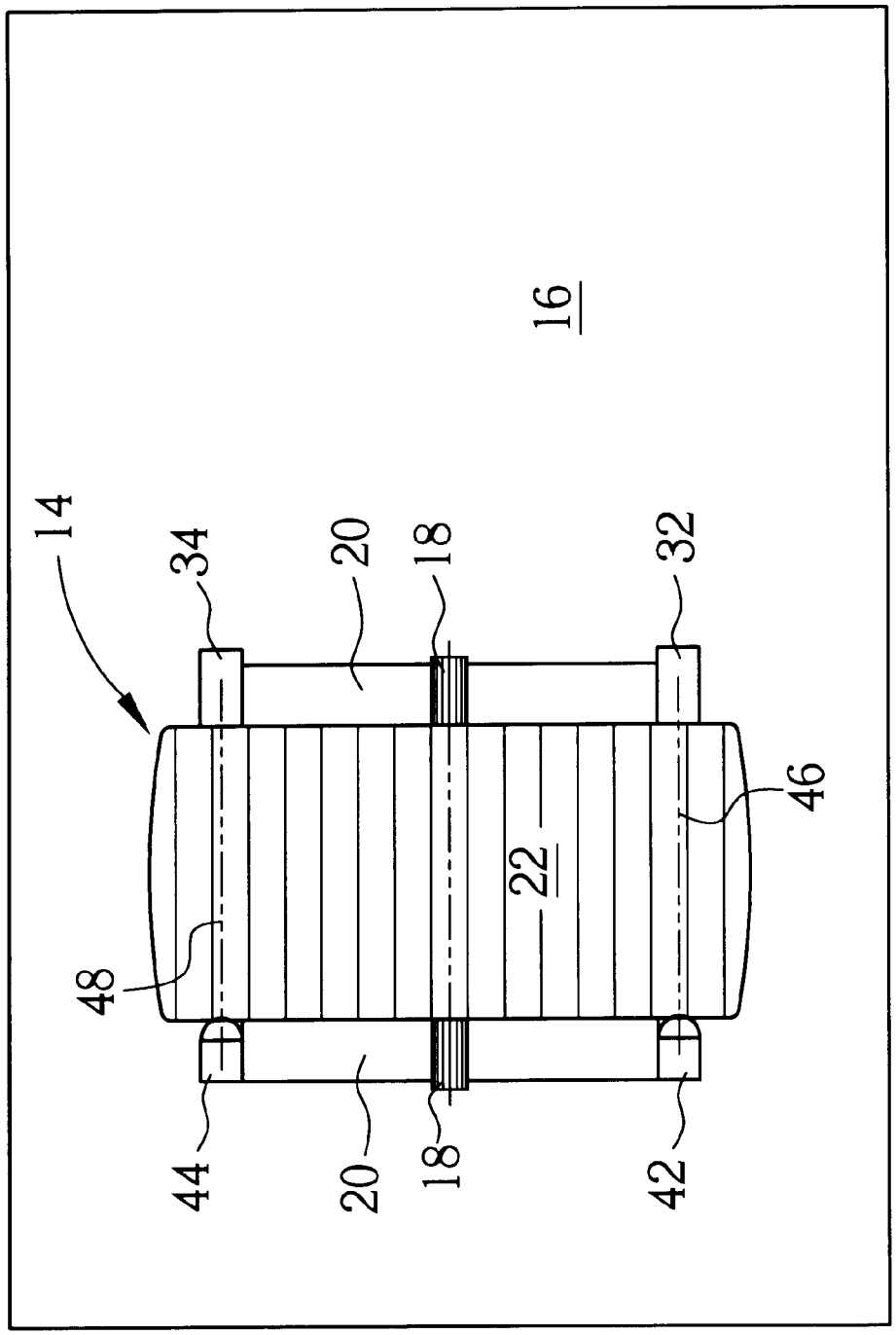
FIG. 3 is a top view of the inner portion of FIG. 2.
Figure 4A:
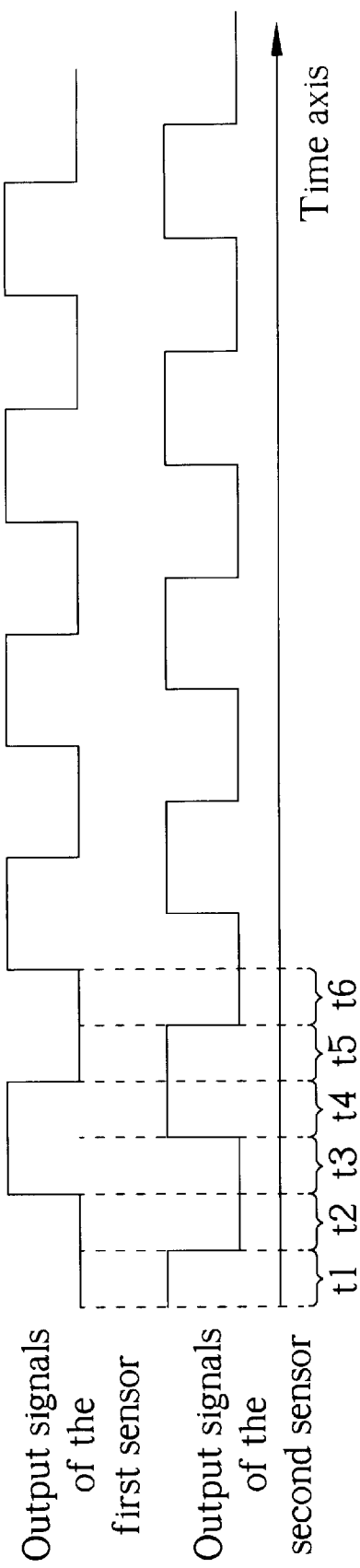
FIG. 4a is a diagram of output signals of two sensors versus time when the wheel of the prior art mechanical mouse rotates clockwise.
Figure 4B:
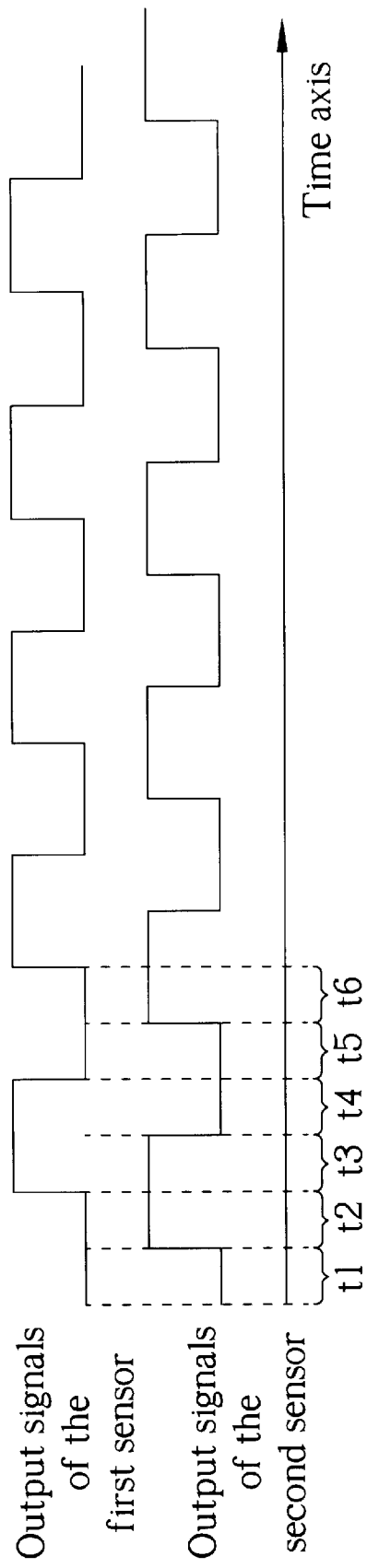
FIG. 4b is a diagram of output signals of two sensors versus time when the wheel of the prior art mechanical mouse rotates counterclockwise.
Figure 6:
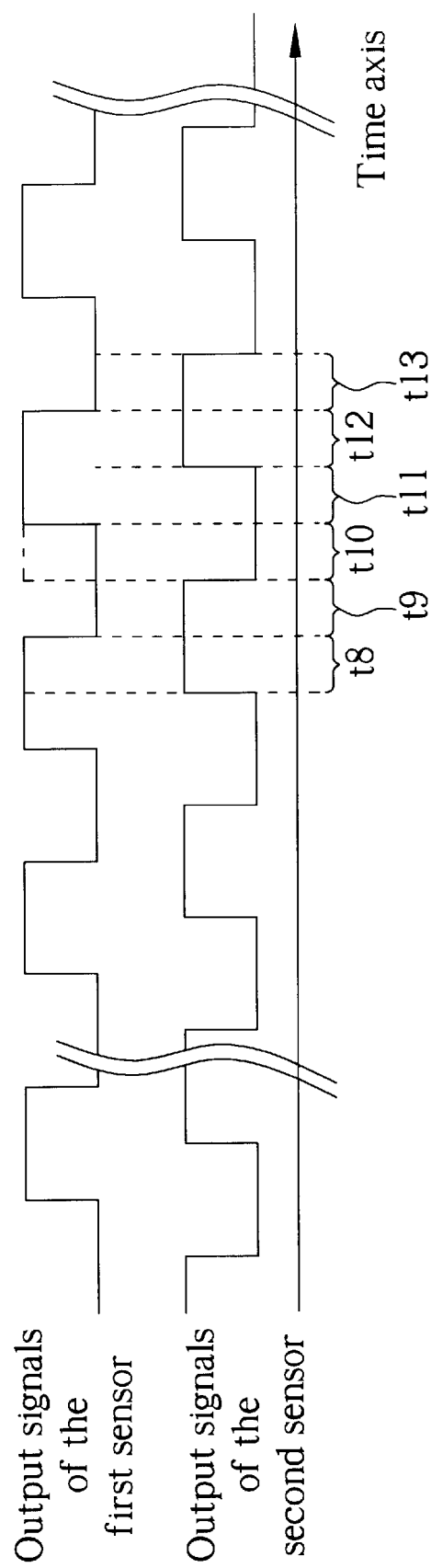
FIG. 6 is a diagram of the output signals of two sensors versus time when a defective wheel of the prior art mechanical mouse rotates clockwise.
Figure 7:
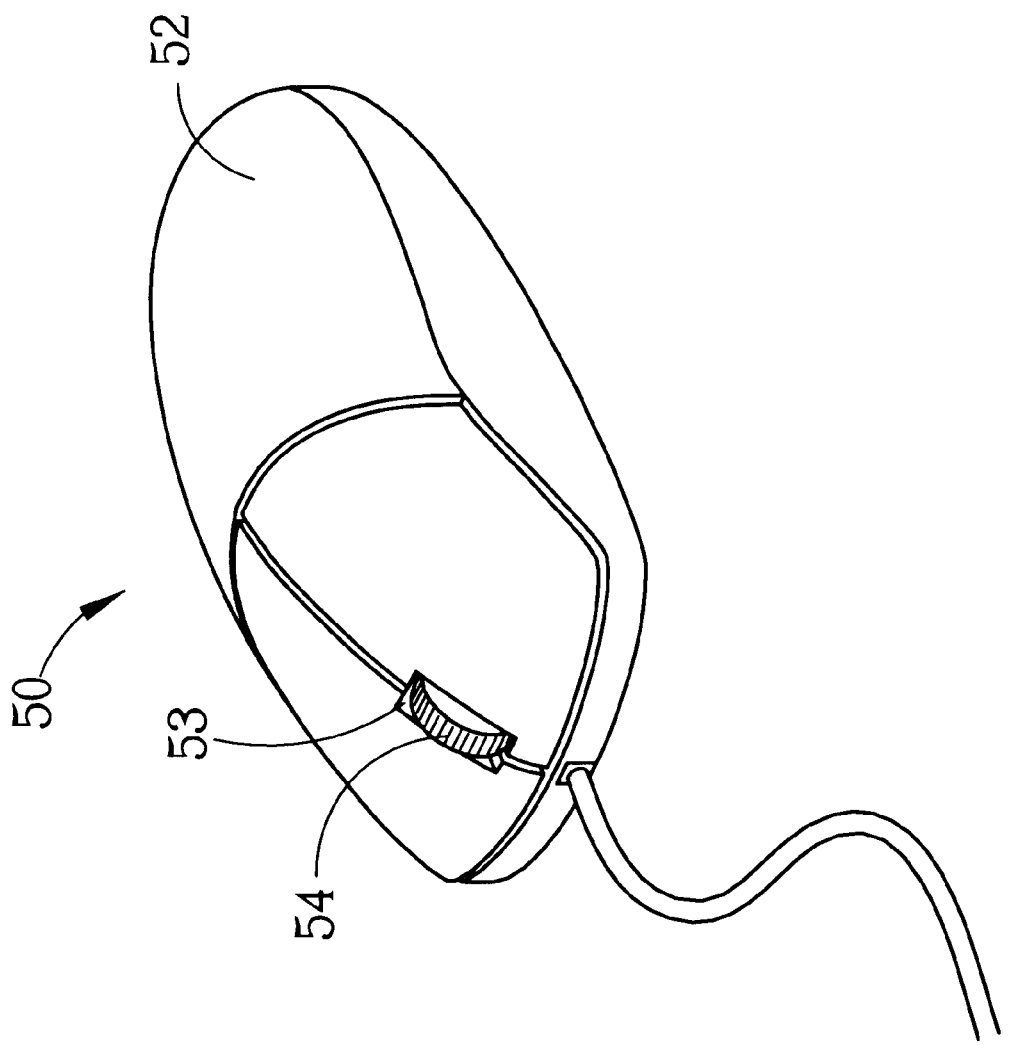
FIG. 7 is a perspective view of a mouse with a wheel according to the present invention.

FIG. 7 is a perspective view of a mouse 50 with a wheel 54 according to the present invention. The mouse 50 comprises a housing 52. An opening 53 is formed in the housing 52 and the wheel 54 is disposed inside the opening 53. The mouse 50 presents the same method of operation for a user as the prior art mouse, and so requires no further discussion.

Figure 8:
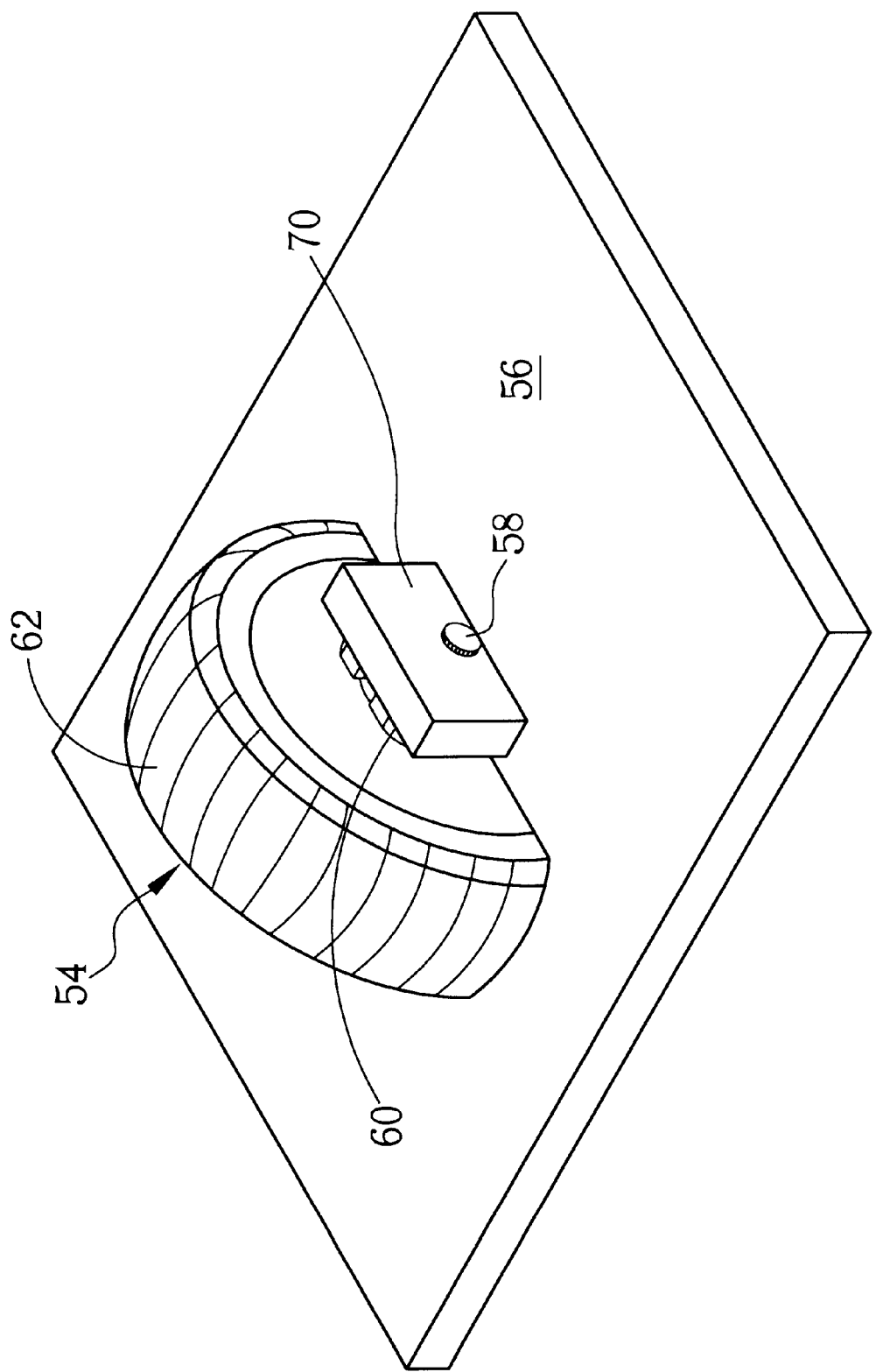
FIG. 8 is a perspective view of an inner portion of the mouse of FIG. 7.
Figure 9:
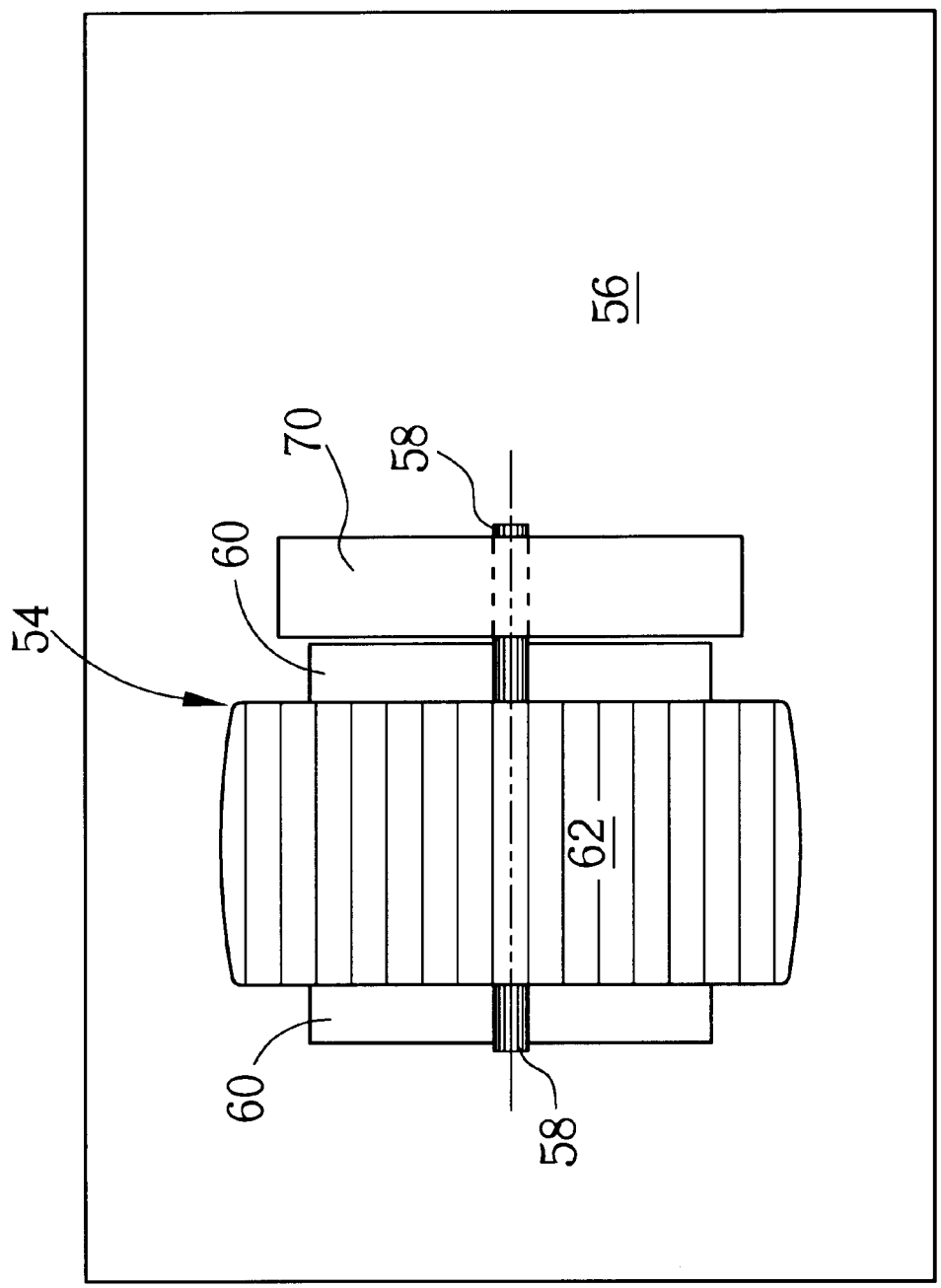
FIG. 9 is a top view of the inner portion of FIG. 8.

FIG. 8 is a perspective view of an inner portion of the mouse 50 shown in FIG. 7. FIG. 9 is a top view of the inner portion shown in FIG. 8. As shown in FIG. 8 and FIG. 9, the mouse 50 further comprises a substrate 56 disposed inside the housing 52, a support 60 installed on the substrate 56, a shaft 58 extending into the support 60 and connected to the wheel 54, and a switch mechanism 70 installed on one side of the support 60. The switch mechanism 70 is driven by the shaft 54 so as to have synchronous operation with the wheel 54.

Figure 10:
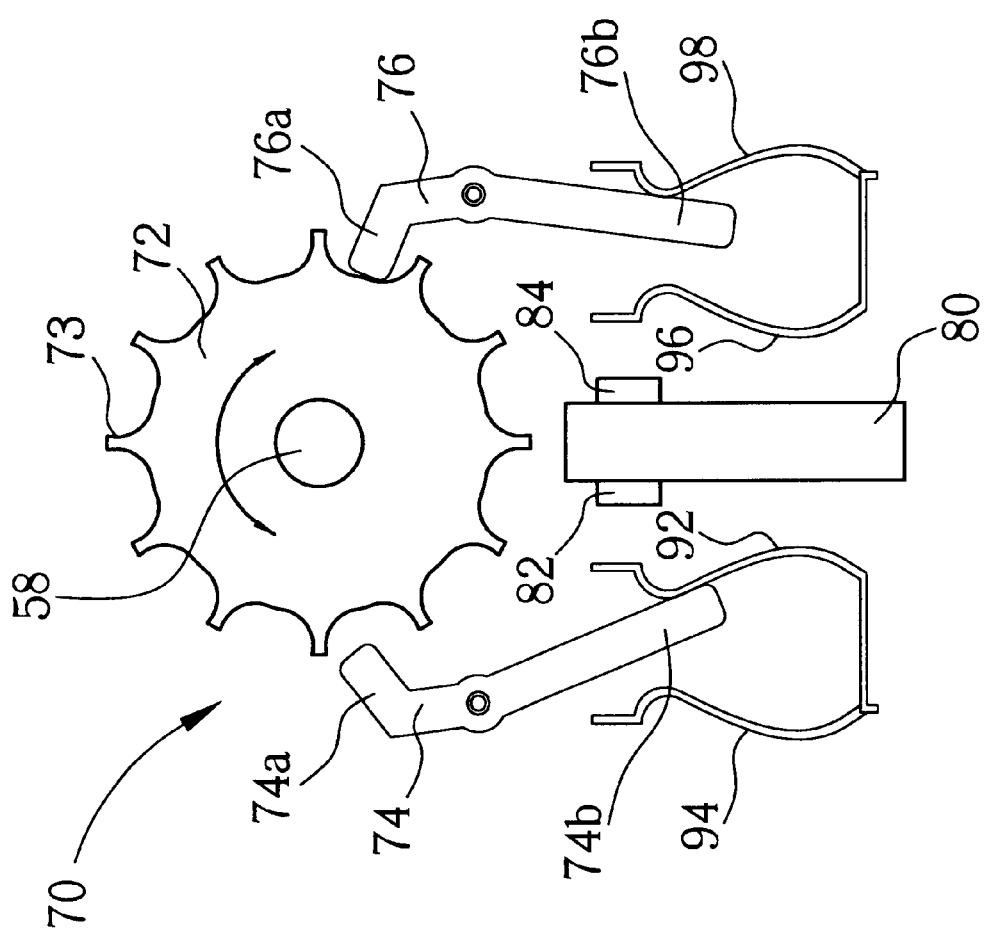
FIG. 10 is a side view of a switch mechanism of a mouse according to the present invention.

FIG. 10 is a side view of an inner portion of the switch mechanism 70 according to the present invention. As shown in FIG. 10, the switch mechanism 70 comprises a ratchet 72 having a plurality of sawteeth 73, a first tappet 74 installed on one side of the ratchet 72, a second tappet 76 installed on another side of the ratchet 72, a positioning plate 80 disposed on the substrate 56 between second ends of the first tappet 74 and the second tappet 76, a first sensor 82 installed on one side of the positioning plate 80 adjacent to the first tappet 74, a second sensor 84 installed on another side of the positioning plate 80 adjacent to the second tappet 76, a first inner elastic piece 92 disposed between the first tappet 74 and the first sensor 82, a first outer elastic piece 94 disposed on an outer side of the first tappet 74, a second inner elastic piece 96 disposed between the second tappet 76 and the second sensor 84, and a second outer elastic piece 98 disposed on an outer side of the second tappet 76. The first sensor 82 and the second sensor 84 generate corresponding detecting signals, respectively. When the ratchet 72 rotates, the sawteeth 73 of the ratchet 72 push the first tappet 74 and the second tappet 76 so as to cause the first sensor 82 or the second sensor 84 to generate the detecting signals. When the first sensor 82 generates detecting signals, the second sensor 84 will not generate detecting signals. Conversely, when the second sensor 84 generates detecting signals, the first sensor 82 will not generate detecting signals.

The ratchet 72 is connected with the wheel 54 by the shaft 58, and so the rotational speed and rotational direction of the ratchet 72 matches those of the wheel 54. Of course, the shaft 58 may be replaced by a gear set, and in this case the rotational speed (and even direction) of the ratchet 72 may differ from that of the wheel 54. Nevertheless, in either case the rotational speed and direction of the ratchet 72 corresponds to those of the wheel 54 in a known way, and so may be thought of as equivalent. Such an alternative design is thus within the bounds of the present invention.

Figure 12:
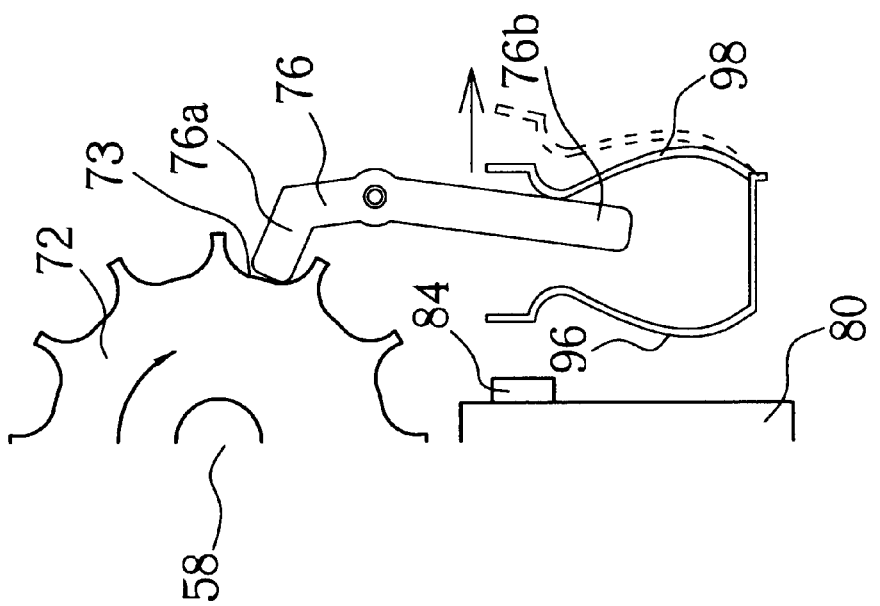
FIG. 12 is a diagram of a right half portion of a present invention switch mechanism when a ratchet rotates clockwise.
Figure 11:
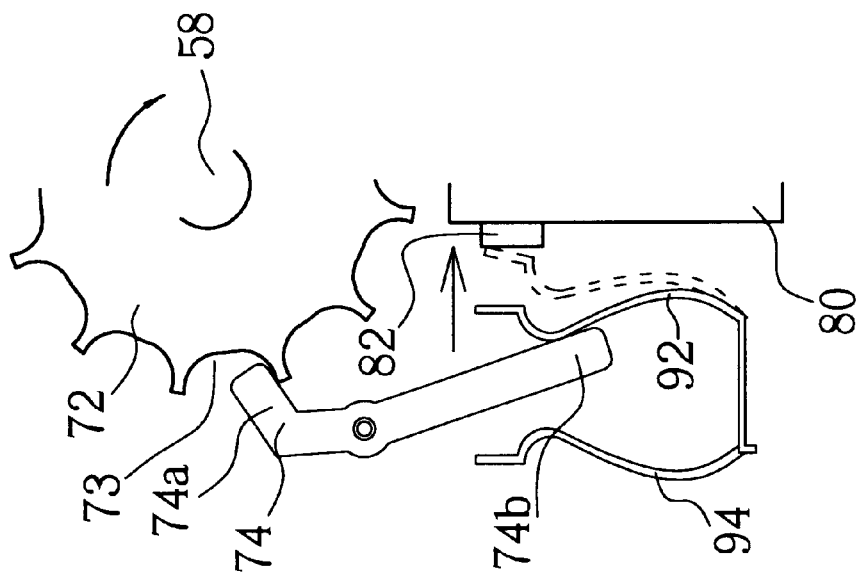
FIG. 11 is a diagram of a left half portion of a present invention switch mechanism when a ratchet rotates clockwise.

FIG. 11 is a diagram of a left half portion of the present invention switch mechanism 70 when the ratchet 72 rotates clockwise. FIG. 12 is a diagram of a right half portion of the present invention switch mechanism 70 when the ratchet 72 rotates clockwise. As shown in FIG. 11 and FIG. 12, when the ratchet 72 rotates clockwise and pushes the first end 74a of the first tappet 74, the first tappet 74 rotates counterclockwise so as to cause the second end of 74b the first tappet 74 to push the first inner elastic piece 92. Therefore, the first inner elastic piece 92 is pushed away from an initial position and triggers the first sensor 82. The first sensor 82 thus generates the detecting signal. At the same time, the ratchet 72 will also push the second tappet 76, causing the second tappet 76 to push against the second outer elastic piece 98, pushing the second outer elastic piece 98 away from an initial position. The second inner elastic piece 96 does not trigger the second sensor 84, and so the second sensor 84 does not generate a detecting signal.

As the first end 74a of the first tappet 74 and the first end 76a of the second tappet 76 continue to move across the sawtooth 73, the first inner elastic piece 92 elastically pushes against the second end 74b of the first tappet 74 and returns to its initial position. Similarly, the second outer elastic piece 98 elastically pushes the second end 76b of the second tappet 76 and returns to its initial position. Because the second inner elastic piece 96 does not trigger the second sensor 84, the second sensor 84 does not generate any detecting signal.

With the continuous clockwise rotation of the ratchet 72, the first sensor 82 will repetitively generate detecting signals, whereas the second sensor 84 will generate no detecting signal. Thus, when the first sensor 82 generates a detecting signal, it can be inferred that the wheel 54 is rotating clockwise. Of course, it should be clear from the symmetry of the switch mechanism 70 that counter-clockwise rotations will cause the second inner elastic piece 96 to make contact with the second sensor 84 and thus generate a signal, while the first inner elastic piece 92 will make no contact with the first sensor 82 and hence generate no corresponding signal. Consequently, signals from the second sensor 84 are inferred as counter-clockwise rotations of the wheel 54. The rotational angle covered by the wheel 54 may be inferred from the number of detecting signals generated.

Of course, the switch mechanism 70 of the present invention may also be used in trackballs, joy sticks and other such pointing devices or input devices.

In contrast to the prior art, the switch mechanism 70 of the present invention mouse 50 determines the rotational direction of the wheel 54 according to a single detecting signal that is generated by either the first sensor 82 or the second sensor 84. There is no need to compare two detecting signals to each other. Therefore, even if the spacing interval between adjacent sawteeth 73 of the ratchet 72 is not precise, the mouse 50 still correctly determines the rotational direction of the wheel 54.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A switch mechanism comprising:
   a ratchet having a plurality of sawteeth;
   two tappets rotatably installed at two opposite sides of the ratchet, each tappet having a pivot, a first end and a second end, the first end and the second end being rotatable along a clockwise direction and a counter-clockwise direction with respect to the pivot; and
   two sensors each disposed beside the second end of a corresponding tappet for generating detecting signals when triggered by the second end of the tappet;
   wherein when the ratchet rotates clockwise, the sawteeth of the ratchet push the first ends of the two tappets to cause the tappets to rotate counterclockwise thereby driving the second end of one of the two tappets to trigger the corresponding sensor so as to generate detecting signals and driving the second end of another tappet further away from the corresponding sensor.

2. The switch mechanism of claim 1 further comprising two inner elastic pieces each positioned between the second end of a tappet and a corresponding sensor, wherein when a sawtooth of the ratchet pushes the first end of a tappet to cause the second end of the tappet to push the corresponding inner elastic piece, the inner elastic piece is pushed away from an initial position to trigger the corresponding sensor to generate detecting signals, and when the sawtooth moves across the first end of the tappet, the inner elastic piece elastically pushes the second end of the tappet so that the inner elastic piece is capable of returning to the initial position.

3. The switch mechanism of claim 2 further comprising two outer elastic pieces positioned beside the second ends of the two tappets, the second end of each tappet being disposed between a corresponding inner elastic piece and a corresponding outer elastic piece, wherein when a sawtooth of the ratchet pushes the first end of a tappet, the second end of the tappet will push the corresponding outer elastic piece away from an initial position; and when the sawtooth moves across the first end of the tappet, the outer elastic piece will elastically push the second end of the tappet so that the outer elastic piece is capable of returning to the initial position.

4. The switch mechanism of claim 1 being disposed inside a mouse.

5. The switch mechanism of claim 4 wherein the mouse further comprises:

a housing with an opening formed thereon;

a wheel disposed in the opening; and a shaft connecting the wheel and the ratchet for driving the ratchet when rotating the wheel;

wherein when a user rotates the wheel in the opening of the housing, the shaft is rotated with the wheel and drives the ratchet to rotate so as to generate corresponding detecting signals.

6. The switch mechanism of claim 5 wherein the mouse further comprises a substrate disposed inside the housing and a support installed on the substrate for holding the shaft so that the shaft is capable of rotating on the support when the wheel rotates.

7. The switch mechanism of claim 6 wherein the mouse further comprises a positioning plate disposed between the second ends of the two tappets, the two sensors being fixed on two opposite sides of the positioning plate.

* * * * *